US008949799B2

(12) United States Patent
Che et al.

(10) Patent No.: US 8,949,799 B2
(45) Date of Patent: Feb. 3, 2015

(54) PROGRAM LOG RECORD OPTIMIZATION

(71) Applicant: International Business Machines Corporation, Armonk, NY (US)

(72) Inventors: Yang Che, Beijing (CN); Zhi Da Luo, Beijing (CN); Ye Xin Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 13/653,571

(22) Filed: Oct. 17, 2012

(65) Prior Publication Data

US 2013/0111451 A1   May 2, 2013

(30) Foreign Application Priority Data

Oct. 31, 2011   (CN) .......................... 2011 1 0337895

(51) Int. Cl.
*G06F 9/44* (2006.01)
*G06F 9/45* (2006.01)
*G06F 11/34* (2006.01)
*G06F 11/36* (2006.01)

(52) U.S. Cl.
CPC ........ *G06F 11/3476* (2013.01); *G06F 11/3628* (2013.01); *G06F 11/3466* (2013.01); *G06F 11/3636* (2013.01); *G06F 2201/865* (2013.01)
USPC ............ 717/128; 717/110; 717/124; 717/151

(58) Field of Classification Search
CPC ............ G06F 11/3636; G06F 11/3466; G06F 11/3476; G06F 11/3409; G06F 2201/865; G06F 11/3628
See application file for complete search history.

(56) References Cited

U.S. PATENT DOCUMENTS

| 7,065,537 | B2 | 6/2006 | Cha et al. |
| 7,086,034 | B2 | 8/2006 | Mihara |
| 7,188,279 | B2 | 3/2007 | Iizuka |

(Continued)

FOREIGN PATENT DOCUMENTS

KR   10-0725415   5/2007

OTHER PUBLICATIONS

Alex Groce, Exploiting Traces in Program Analysis, 2006, pp. 1-14.*

(Continued)

*Primary Examiner* — Thuy Dao
*Assistant Examiner* — Mongbao Nguyen
(74) *Attorney, Agent, or Firm* — Stephen J. Walder, Jr.; Jeffrey S. LaBaw (57) ABSTRACT

The present invention relates to application program logs. In particular, the invention relates to a method and a system in which an original log method of an application program is optimized and newly injected to the application program. According to one aspect of the present invention, there is provided a method for optimizing an application program log record, comprising: identifying an original log method of an application program; separating a character string parameter in the original log method into a constant part and a variable part; establishing a correspondence flag between the constant part and the variable part; constituting an optimized log method by the constant part, the variable part and the correspondence flag; and replacing the original log method with the optimized log method through a code injection. With the above method, the hard disk storage amount of the log record and the IO operation frequency can be reduced.

21 Claims, 5 Drawing Sheets

(56) References Cited

U.S. PATENT DOCUMENTS

| | | | |
|---|---|---|---|
| 7,191,256 B2 | 3/2007 | Adams et al. | |
| 7,191,268 B2 | 3/2007 | Adams et al. | |
| 7,415,614 B2 | 8/2008 | Guillou | |
| 7,426,660 B2 | 9/2008 | Chen et al. | |
| 7,444,362 B2 | 10/2008 | Marsh et al. | |
| 7,707,429 B2 | 4/2010 | Jin et al. | |
| 7,778,979 B2 | 8/2010 | Hatonen et al. | |
| 7,801,855 B2 | 9/2010 | Kim et al. | |
| 7,822,986 B2 | 10/2010 | Guillou | |
| 8,209,662 B2* | 6/2012 | Nathan et al. | 717/110 |
| 8,473,902 B2* | 6/2013 | Davies et al. | 717/110 |
| 8,499,293 B1* | 7/2013 | Ashcraft et al. | 717/151 |
| 8,799,882 B2* | 8/2014 | Tarditi et al. | 717/151 |
| 2005/0229154 A1* | 10/2005 | Hiew et al. | 717/110 |
| 2007/0288900 A1* | 12/2007 | Lev et al. | 717/124 |
| 2007/0294671 A1* | 12/2007 | Demetriou et al. | 717/124 |
| 2008/0127095 A1* | 5/2008 | Brennan et al. | 717/124 |
| 2008/0235297 A1* | 9/2008 | Lee | 707/202 |
| 2009/0007065 A1* | 1/2009 | Becker | 717/110 |
| 2010/0088683 A1* | 4/2010 | Golender et al. | 717/128 |
| 2010/0131931 A1* | 5/2010 | Musuvathi et al. | 717/128 |
| 2011/0067008 A1* | 3/2011 | Srivastava et al. | 717/128 |
| 2011/0191758 A1* | 8/2011 | Scharf | 717/151 |
| 2011/0214109 A1* | 9/2011 | Pedersen | 717/128 |
| 2012/0137273 A1* | 5/2012 | Meijler et al. | 717/128 |

OTHER PUBLICATIONS

GeoTrust, Introduction to Web Analytics for E-Commerce: How to track activity to optimize your web site, 2011, pp. 1-7.*

Sanjay Bhansali, Framework for Instruction-level Tracing and Analysis of Program Executions, 2006, pp. 1-9.*

Montesinos, Pablo et al., "DeLorean: Recording and Deterministically Replaying Shared-Memory Multiprocessor Execution Efficiently", 2008 International Symposium on Computer Architecture, Jun. 21-25, 2008, 12 pages.

\* cited by examiner

PROGRAM LOG RECORD OPTIMIZATION

BACKGROUND

The present invention relates to the technical field of an application program log. In particular, the invention especially relates to a method and a system in which an original log method of an application program is optimized and newly injected to the application program.

A log method for an application program is a method in which the application program is injected to some instructions of the code of the program itself at time of development, so as to be used to record various events that occur when the program is executed and monitor execution of the program, and thereby to help to learn execution states of the system and the program and to diagnose problems that occur. For example, in order to monitor for an error in network connection that may occur at time of execution of an application program, it is possible to insert a relevant log method into the program and record information corresponding to the occurred error in network connection, such as IP address, error time, or the like, into a log file so that a program administrator can perform analysis and diagnosis thereon. Research shows that about 5 application program code is specifically provided to record a program log.

Figure 2:
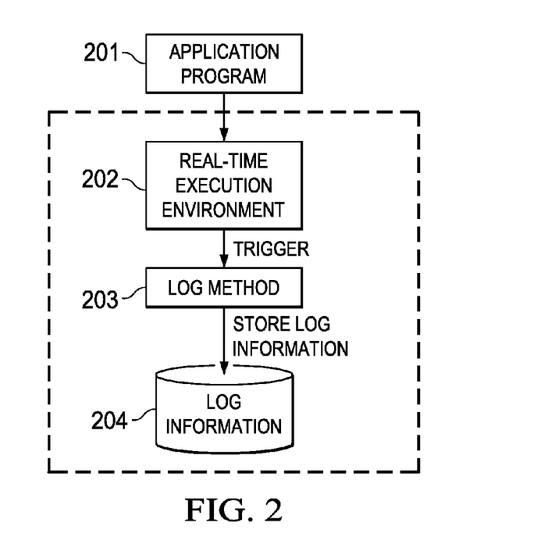
FIG. 2 shows a diagram of a known program log generation mechanism.

A known program log system is shown in FIG. 2, in which the code of the program itself and the code for a log method for generating a log record are included in an application program 201. Under a real-time execution environment 202, the generation of a log record may be triggered by the application program during execution, and log information 204 may be generated by performing the log method 203. Log information 204 is generally provided in a form of files, and is stored on a hard disk or other storage medium.

Hitherto, there are two major problems that exist in the known program log record generation methodology. The first major problem is that the generation of the program log record may consume a large amount of hardware resources to store the log files. During execution of the program, there may be a large amount of log information to be recorded in the hard disk or other storage means, and there is no limit on the size of the log information. Due to a limitation of the hard disk capacity, the older log information may be automatically removed, resulting in a loss of important information. The second major problem is that recording a large amount of log information may cause frequent IO (input and output) operations, and thus, the speed of execution of the application program is reduced.

In the known mechanisms, technical schemes for solving the above problems include using a log policy that is adjusted based on performance overhead, which indicates the resources occupied by the log record generation operation. Essentially, this existing technical scheme achieves an improvement in performance at the sacrifice of integrity of the log information. This technical scheme also suffers from the problem of loss of log information and can be adopted only at time of development of the application program. Moreover, the size of the log file cannot be reduced without modifying the existing program code and the log record mechanism (legacy mechanism). For another known technical scheme, the existing log record mechanism is manually altered requiring a large amount of time and an in-depth understanding of the program code, which is not feasible in practice.

SUMMARY

Considering the above existing problems, one object of the present invention is to provide a method and a system for generating an application program log record that is capable of reducing a storage amount of the log information. A further object of the present invention is to provide a method and a system for generating an application program log record that reduces the performance impact imposed by log record generation operations on the execution of the application program. A still further object of the present invention is to provide a method and a system for application program log record generation that is capable of reducing the performance impact imposed on the execution of the application program by the log record generation operation by reducing the storage size amount of the log information.

According to one aspect of the present invention, there is provided a method for optimizing an application program log record generation operation, comprising: identifying an original log method of an application program; separating a character string parameter in the original log method into a constant part and a variable part; establishing a correspondence flag between the constant part and the variable part; constituting an optimized log method by the constant part, the variable part and the correspondence flag; and replacing the original log method with the optimized log method through a code injection.

According to one embodiment of the present invention, the log information corresponding to the constant part is only recorded once, and the log information corresponding to the variable part is recorded each time the log record generation operation is triggered.

According to another aspect of the present invention, there is provided a system for optimizing an application program log record generation operation, comprising: a log method identification means configured to identify an original log method of an application program; a parameter separation means configured to separate a character string parameter in the original log method into a constant part and a variable part; a flag establishment means configured to establish a correspondence flag between the constant part and the variable part; an optimized log method construction means configured to constitute an optimized log method by the constant part, the variable part and the correspondence flag; and a log method replacement means configured to replace the original log method with the optimized log method through a code injection.

According to the method and the system of the present invention, the storage size amount of the log information will be reduced and the IO operations on the log record can be decreased, so that the effect imposed by the execution of the application program on performance can be reduced. Meanwhile, injection of codes can be realized at object code level, and it is not necessary to change the log record mechanism of the existing application program—conditions for triggering the log record generation operation, and log record finally generated, are from those of the original log method.

BRIEF DESCRIPTION OF THE SEVERAL VIEWS OF THE DRAWINGS

The above and other features of the present invention will be more apparent with detailed description of the embodiments shown in connection with the appended drawings, in which a same reference number in the appended drawings denotes a same or similar means. In the appended drawing.

DETAILED DESCRIPTION

Hereinafter, with reference to the appended drawings, mechanisms for optimizing application program log record generation according to the present invention will be described.

Those skilled in the art will recognize that aspects of the present invention may be embodied as a system, method, or a computer program product. Accordingly, a plurality of aspects of the present invention may be embodied entirely in hardware, entirely in software (including firmware, resident software, microcode, etc.), or a combination of software components and hardware components, which are generally referred to herein as "circuit", "module" or "system". In addition, a plurality of aspects of the present invention may also take the form of a computer program product embodied in one or more computer readable mediums having a computer usable program code stored therein.

Any combination of one or more computer readable medium(s) can be used. The computer readable medium can be a computer readable signal medium or a computer readable storage medium. For example, the computer readable storage medium can be, but is not limit to, an electric, magnetic, optical, electromagnetic, infrared or semi-conductive system, apparatus or device, or any combination thereof. More specific examples (a non-exhaustive list) of the computer readable storage medium include the following: an electrical connection with one or more wires, a portable computer disk, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any appropriate combination thereof. In the context of this document, the computer readable storage medium can be any tangible medium containing or storing a program for use by or in connection with an instruction executing system, apparatus or device.

The computer readable signal medium may include a propagated data signal propagated in a base band or as part of a carrier wave, in which the computer readable program code is embodied. Such a propagated signal can adopt a variety of forms including, but not limited to, an electromagnetic signal, an optical signal or any appropriate combination thereof. The computer readable signal medium can be any computer readable medium rather than a computer readable storage medium, which is capable of transmitting, propagating or transporting the program for use by or in connection with an instruction executing system, apparatus or device. The program code contained on the computer readable medium can be transmitted with any appropriate medium including, but not limited to, wireless, wireline, optical fiber cable, RF or the like, or any appropriate combination thereof.

The program code contained on the computer readable medium can be transmitted with any appropriate medium including, but not limited to, wireless, wireline, optical fiber cable, RF or the like, or any appropriate combination thereof.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on a user's computer, as a stand-alone software package, partly on a user's computer and partly on a remote computer or entirely on a remote computer or server. In the latter scenario, the remote computer may be connected to the user's computer through any type of network, including a local area network (LAN), or a wide area network (WAN), or the connection may be made to an external computer (for example, through the Internet using an Internet Service Provider).

Hereafter, aspects of the present invention are described with reference to the flowcharts and/or block diagrams of the method, apparatus (system) and computer program product embodiments of the present invention. It is understood that each block of the flowcharts and/or block diagrams, and combinations of blocks in the flowcharts and/or block diagrams, can be implemented by computer program instructions. These computer program instructions may be provided to a processor of a general purpose computer, special purpose computer, or other programmable data processing apparatus, thereby producing a machine, such that the instructions, which execute by the computer or the other programmable data processing apparatus, create means for implementing the functions/operations specified in the block or blocks in the flowcharts and/or block diagrams.

These computer program instructions may also be stored in a computer-readable medium that can direct a computer or other programmable data processing apparatus to function in a particular manner, such that the instructions stored in the computer-readable medium produce an article of manufacture including instruction means implementing the functions/operations specified in the block or blocks in the flowcharts and/or block diagrams.

The computer program instructions may also be loaded onto a computer or other programmable data processing apparatus to cause a series of operation steps to be performed on the computer or other programmable data processing apparatus to generate a computer implemented process such that the instructions which execute on the computer or other programmable data processing apparatus provide processes for implementing the functions/operations specified in the block or blocks in the flowcharts and/or block diagrams.

Figure 1:
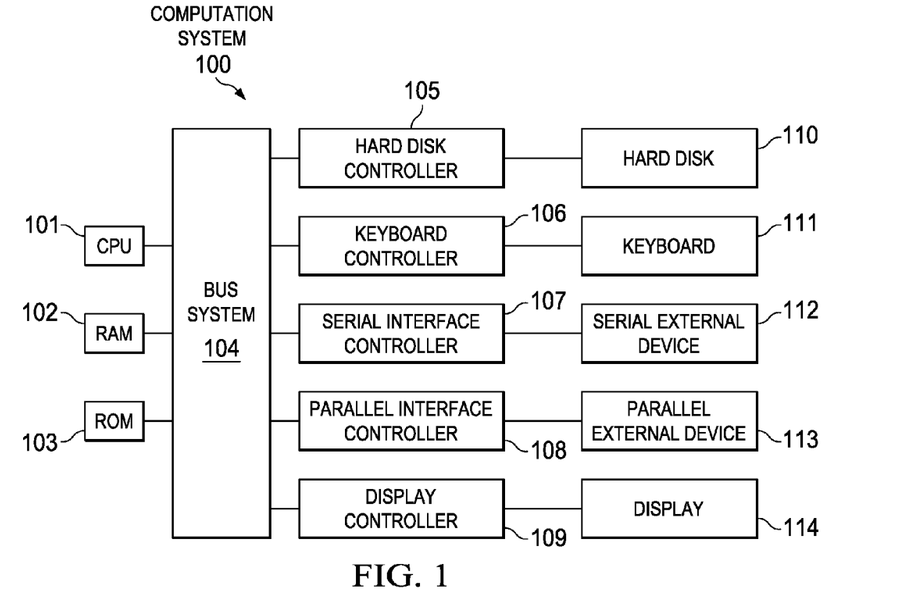
FIG. 1 shows a block diagram for implementing a exemplified computation system 100 of an embodiment of the present invention.

FIG. 1 shows a block diagram of an example computer system 100 according to an embodiment of the present invention. As shown, the computer system 100 can include a CPU (Central Processing Unit) 101, a RAM (Random Access Memory) 102, a ROM (Read Only Memory) 103, a system bus 104, a hard disk controller 105, a keyboard controller 106, a serial interface controller 107, a parallel interface controller 108, a display controller 109, a hard disk 110, a keyboard 111, a serial external device 112, a parallel external device 113 and a display 114. Among these devices, connected to the system bus 104 are the CPU 101, the RAM 102, the ROM 103, the hard disk controller 105, the keyboard controller 106, the serial controller 107, the parallel controller 108 and the display controller 109. The hard disk 100 is coupled to the hard disk controller 105, the keyboard 111 is coupled to the keyboard controller 106, the serial external device 112 is coupled to the serial interface controller 107, the parallel external device 113 is coupled to the parallel interface controller 108, and the display 114 is coupled to the display controller 109. It should be understood that, the structural block diagram shown in FIG. 1 is illustrated for the purpose of example, and not a limitation to the scope of the present invention. In some cases, some devices can be added or removed from the structural diagram shown in FIG. 1 depending on specific cases.

Figure 3:
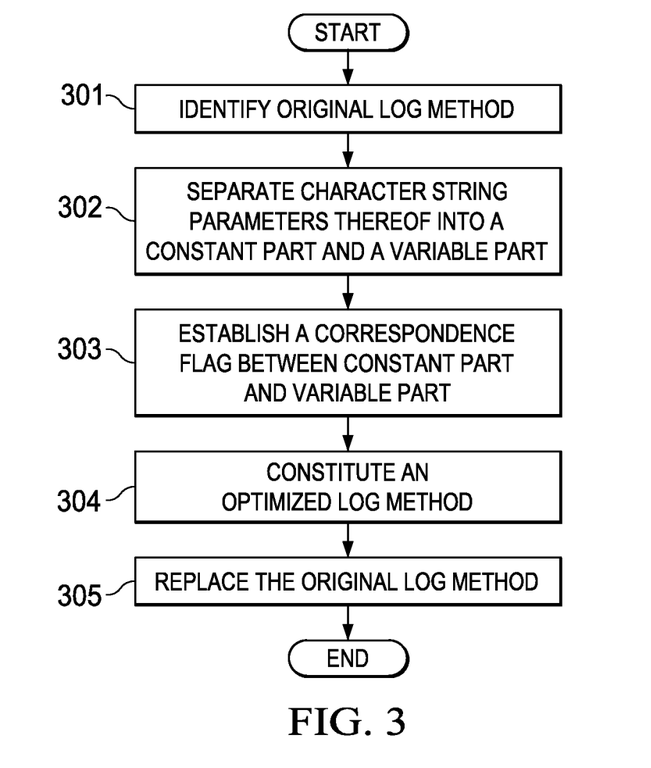
FIG. 3 shows a flowchart of a method for optimizing application program log record generation according to an embodiment of the present invention.

FIG. 3 shows a flowchart of a method for optimizing application program log record generation according to an embodiment of the present invention. The method shown in FIG. 3 starts from step 301. In step 301, the original log method of the application program is identified. Here, the term of "method" is a concept in object-oriented program, which is a lower level concept of the program "class"; the program code is contained in the "method", and all of the "method(s)" are asserted in the "class". The term of "original log method" refers to code compiled already for program log record generation during development of the application program, so as to distinguish from the term "optimized log method" below. According to an embodiment of the present invention, since a large majority of application programs only provide the object codes (binary codes) having been complied rather than the source codes, by retrieving the object codes of the application program, the original log method contained therein is identified. According to another embodiment of the present invention, in a case where the application program provides the source code, the original log method is identified by retrieving the source code thereof. With respect to details of identifying from the program code the log method contained therein, it should be understood by those skilled in the art that, all of the log methods of the program have a specific name regardless of which kind of the object-oriented programs it is used to compile, thus the log method can be identified by retrieving a "method" in conformity with a specific name from all of the codes of the program. For example, java/io/PrintStream.println:(Ljava/lang/String;)V is a specific log method of Java code, where java/io/PrintStream.println: is a method name thereof, :(Ljava/lang/String;) is a parameter type of the method, and V is a return type of the method. It should be understood that, the present invention is not limited to Java language, and can be applied to any object-oriented language.

There may be many log methods, of which some are used to process character string parameters, and some are used to process parameters other than character string parameters. According to an embodiment of the present invention, identifying the original log method in step 301 refers to only identifying the log method for processing character string parameters. According to another embodiment of the present invention, identifying the original log method in step 301 refers to identifying all of the log methods, and then those log methods for processing the character string parameters are filtered in subsequent steps.

Figure 4:
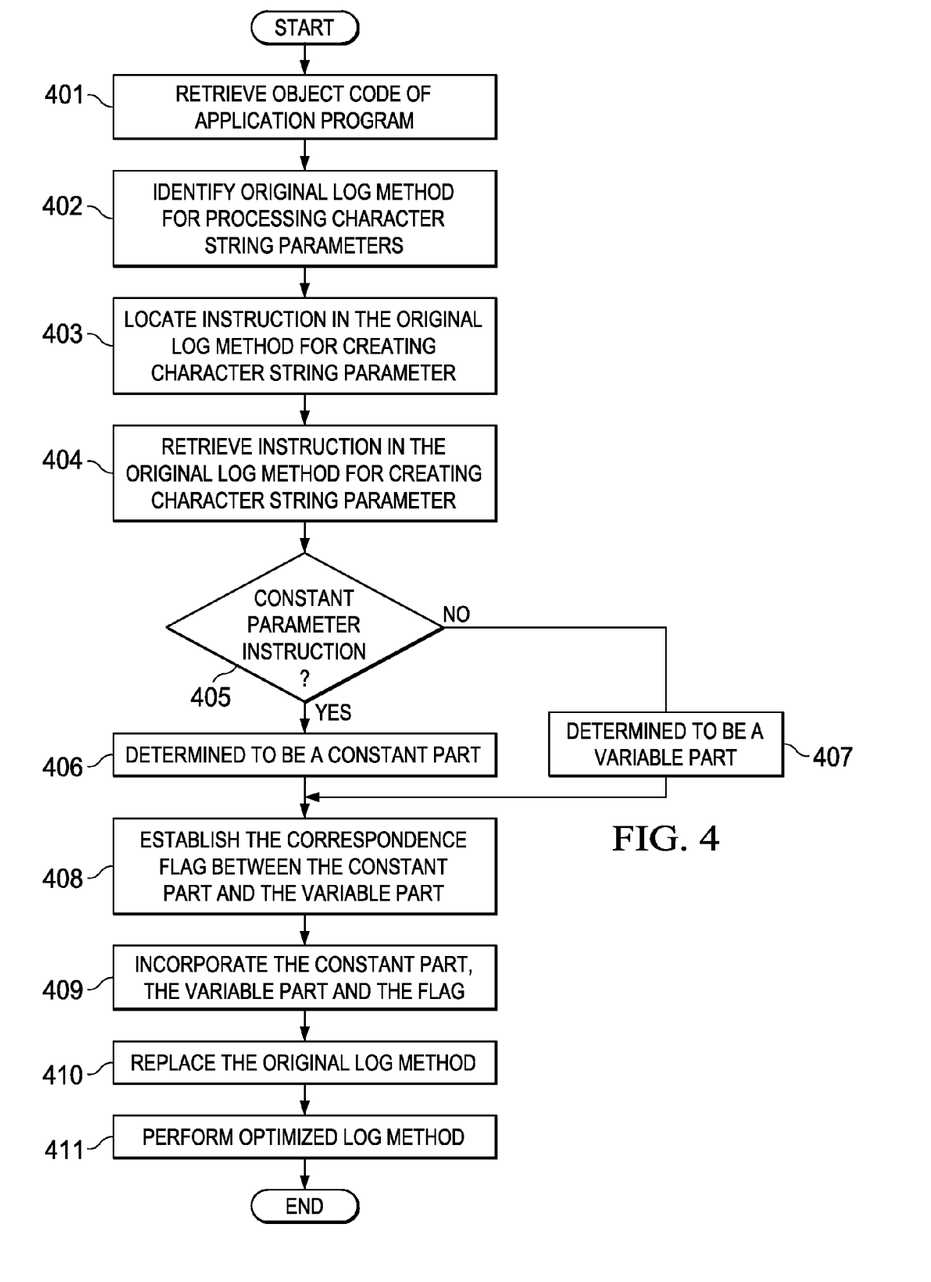
FIG. 4 shows a flowchart of a method for optimizing application program log record generation according to another embodiment of the present invention.
Figure 6A:
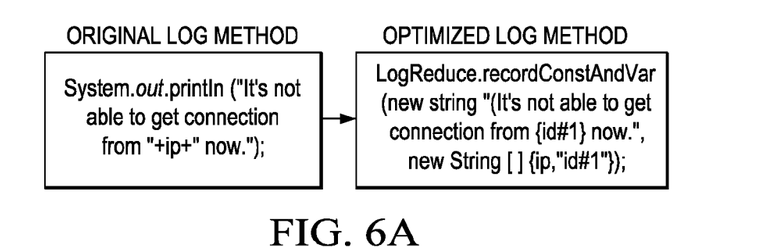
FIG. 6A shows a diagram of an original log file and an optimized log file according to an embodiment of the present invention.

Next, in step 302, the identified character string parameters of the original log method are separated into a constant part and a variable part. Namely, the term "constant part" refers to a characteristic that, no matter what kind of log content is generated during execution of the program, the content of this part of the character string is fixed. The term "variable part" refers to a characteristic that the content of this part of the character string may be changed during a process of recording logs. For example, with reference to the original log method as shown in FIG. 6A, the part inside the parentheses is a character string parameter processed by the log method of System.out.println, of which no change will occurred to the "It's not able to get connection from" and "now" in the log record, thus these portions of the character string belong to the constant part of the character string parameter; whereas the "ip" refers to a specific IP address, which is obviously changed depending on the specific address, and thus belongs to the variable part of the character string parameter. Generally, the constant part and the variable part of the character string parameter have an apparent difference in the source code in terms of literal expression, for example whether or not the quotation marks (" ") or the like are included, and correspondingly has an apparent difference in the object codes as well; whether or not a character string is a constant character string or a variable character string can be judged by retrieving characteristics of the parameter instruction thereof. FIG. 4, and the corresponding description thereof provided hereafter, will more concretely explain an embodiment of the constant part and the variable part of character strings.

In step 303, a correspondence flag between the constant part and the variable part is established. According to one embodiment of the present invention, the correspondence flag is a specific ID. For example, the constant part and the variable part in FIG. 6A are both assigned with a specific correspondence flag of "id#1". The reason for establishing the correspondence flag is that, when the constant part and the variable part are separately processed at subsequent steps, association therebetween will not be lost. It should be understood by those skilled in the art that there may be many kinds of the correspondence flag, and the present invention is not limited to a digital flag, a character flag or the like, as long as the constant part and the variable part corresponding to one character string parameter processed in the original log method can be uniquely associated with each other.

Next, the method shown in FIG. 3 goes to step 304 in which an optimized log method is generated based on the constant part, the variable part and the correspondence flag. As shown in the block diagram at the right of the arrow in FIG. 6A, all of the parameters in the original log method are included in the generated optimized log method however, the character string parameter in the original log method is separated into the constant part and the variable part, both of which are associated with the established correspondence flag, e.g., id#1. It should be especially noted that, for the optimization construction method shown in the block diagram of FIG. 6A, "ConstAndVar" is added to the method name, indicating the parameter includes two parts—the constant and the variable, which also means that the constant part and the variable part can be separately recorded when the optimization construction method is performed. It should be pointed out that, the example shown in FIG. 6A is only an example directed to the Java programming language, and is exhibited in the form of source code for the purpose of comprehension. It should be understood by those skilled in the art that any of the other object-oriented languages can perform the method shown in FIG. 3 based on the concept of the invention, and in most of cases, the performance is made at object code level rather than the source code level.

In step 305, with code injection, the original log method of the application program is replaced with the generated optimized log method. Since the original log method is identified in step 301 and the optimized log method is generated in step 304, the replacement can be made in step 305. The purpose for the replacement is to perform the optimized log method when the application program is executed, so as to recode the two parts of constant and variable portions separated by the return parameter of the original log method, and since contents of the character string of the constant are fixed, the recode is only required to be performed once; whereas contents of the character string of the variable is not fixed, the recode is required to be performed many times. It should be understood by those skilled in the art that the technology of code injection (Code Instrument) at the object code level is generally known in the art and thus, the description thereof will not be repeated herein.

Figure 6B:
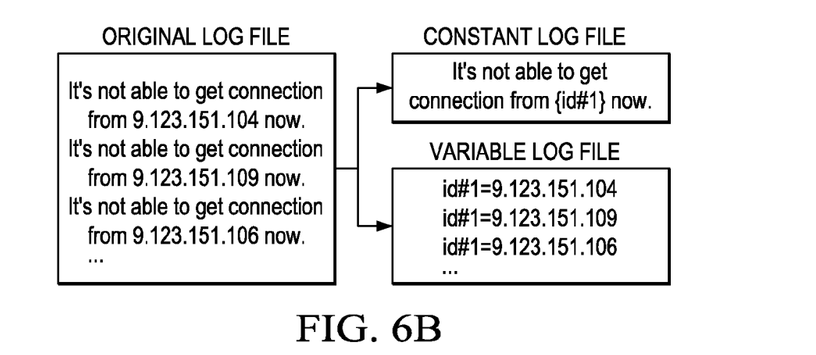
FIG. 6B shows a diagram for recoding a log using the optimized log file according to an embodiment of the present invention.

FIG. 6B shows a diagram for recoding a log file using the optimized log file according to an embodiment of the present invention. As shown in FIG. 6B, the block diagram left of the depicted arrow is a log record generated by performing the original log file generation methodology and it can be seen that, when the original log file generation methodology is performed, the parameter is considered to be a full string. Therefore, it is necessary to fully output a full character string content to the log file every time the log record generation method is triggered (a certain IP address fails to be connected), which renders the contents of "It's not able to get connection from" and "now" to be present in each items of the log record. With time elapsed, it may lead to a large amount of IO operations and cause hard disk space to be occupied rapidly.

The block diagram to the right of the depicted arrow in FIG. 6B shows a log record generated by performing the optimized log file generation methodology shown in FIG. 6A. It can be seen that the constant part of the character string parameter is recorded in the constant log file and the recode is performed only once with a correspondence flag id#1 being contained therein. Whereas the variable part is recorded in the variable log file and the record is generated whenever being triggered. In this regard, if it is necessary to read a full log file, the constant log file and the variable log file corresponding to each other can be combined together through the correspondence flag id#1 so as to generate a full log file. It can be understood that, the constant parameters of a plurality of log methods can be recorded in the constant log file, and the variable parameters of a plurality of the log methods can be recorded in the variable log file. Due to the use of specific correspondence flags, errors will not be generated at the time of combination of the log files.

As described above, with the method shown in FIG. 3, and with reference to the specific example shown FIG. 6, a storage size amount for the log information can be reduced and IO operations for the log record can be decreased, thereby reducing the negative effect of execution of the log generation method on performance of the application program. Meanwhile, injection of codes can be realized at object code level, and it is not necessary to change the log record mechanism of the existing application program—conditions for triggering the log record generation method, and the log record finally generated, are identical to those for a case in which the original log method is utilized.

FIG. 4 shows a flowchart of a method for optimizing application program log record generation according to another embodiment of the present invention. The method shown in FIG. 4 starts from step 401. In step 401, object code of the application program is retrieved. Next, in step 402, the original log method having a specific name for processing character string parameters is identified in categories of the application program. The steps 401 and 402 correspond to step 301 in FIG. 3, and the description thereof has been made in detail hereinabove.

Next, the operation goes to step 403 where an instruction in the original log method for creating a character string parameter is located. Although the original log method for processing the character string parameter has been identified in step 402 for one log method, the instructions contained therein may be more than the instruction for creating the character string parameters and therefore, in order to perform a separation on the character string parameter later on, it is necessary to locate the instruction for creating the character string parameter. Considering that in the program compiled with an object-oriented language, typically, the parameter is stacked and then the asserted method is called. According to one embodiment of the present invention, an instruction for stacking the parameters is iteratively found by using a pointer at first, so as to locate an instruction for constructing the character string parameter. It should be understood by those skilled in the art that it is possible to employ existing technologies to find the instruction in the log method which is used for stacking the parameters.

Next, in step 404, the located instruction for creating the character string parameter is retrieved. According to one embodiment of the invention, retrieving the located instruction for creating the character string parameter includes progressively scanning codes of the instruction for creating the character string parameter. Thereafter, it is judged in step 405 whether or not the retrieved instruction for creating the character string parameter is a constant parameter instruction for processing a constant string. According to one embodiment of the invention, in a Java program, 1dc#number represents a constant character string operation, and therefore, if the instruction of 1dc#number is retrieved (the result of the judgment is Yes), and it is determined in step 406 that the character string parameter created by this instruction is the constant part. Correspondingly, if the result of the judgment is No, it is determined in step 407 that the character string parameter created by the instruction is the variable part. It should be pointed out that, of programs compiled with other object-oriented language than Java, those skilled in the art can design a method with which to judge whether or not the instruction is used for creating the constant character string in accordance with a specific language specification without departing from the concept of the present invention.

Next, no matter whether it is judged to be the constant part or the variable part, the operation goes to step 408 where the correspondence flag between the constant part and the variable part is established. Step 408 corresponds to step 303 in FIG. 3, and the description thereof will not be repeated herein. The method shown in FIG. 4 goes to step 409.

In step 409, the correspondence flag is respectively added to the constant part and the variable part and the constant and variable parts are incorporated so as to constitute the optimized log method. In the block diagram at the right of the depicted arrow shown in FIG. 6A, implementation of step 409 can result in an intuitive representation at the source code level. As shown in FIG. 6A, the incorporation of the constant and variable parts in step 409 means that the constant and variable parts are placed in two sub-parameters (new String) structure under a big parameter of the optimized log method, which is different from a single parameter structure in the original log method in which a connection is made with character string buffer addition method ("+"). It should be pointed out that, the specific way on how to construct the optimized log method with the constant part, the variable part, and the correspondence flag may be different depending on different language specifications. In the embodiments of the present invention described herein, implementation of the concept of the present invention is illustrated only by taking the Java programming language as an example, and it is not intended to impose any limitation on the specific method for constructing optimization log of the present invention.

Next, in step 410, the original log method of the application program is replaced with the constructed optimized log method by the code injection. This step corresponds to step 305 shown in FIG. 3, and the description thereof will not be repeated herein.

Finally, in step 411, the optimized log method is performed to generate the log record of the application program. According to one embodiment of the present invention, performing the optimized log method so as to generate the log record of the application program includes: recording the log information corresponding to the constant part and the correspondence flag into the constant log file, and recording the log information corresponding to the variable part and the correspondence flag into the variable log file. According to one embodiment of the present invention, the log information corresponding to the constant part will be recorded only once, and the log information corresponding to the variable part will be recorded each time as the log record generation method is triggered. Of course, the number of times for record is not absolute, and those skilled in the art can adjust the number of times for record of the constant log information as necessary, and the record can be performed for a number of times which is more than once but lower than times that the log record generation method is triggered.

It should be understood by those skilled in the art that, even if the replaced optimized log method is not practically performed, the object of the present invention has been achieved—the characteristic of the constructed log method itself can guarantee a reduction in IO operations on the log record, a reduction in occupation by the log record on the storage space of the hard disk, and the like.

Figure 5:
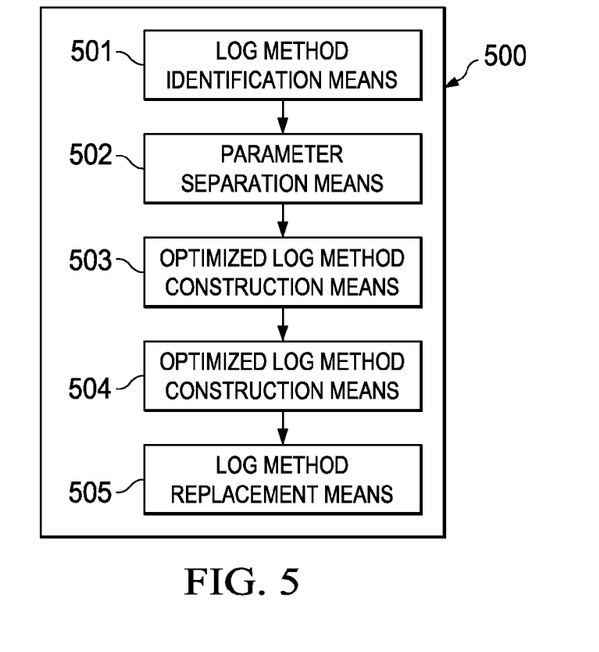
FIG. 5 shows a block diagram of a system for optimizing application program log record generation according to an embodiment of the present invention.

FIG. 5 shows a block diagram of a system for optimizing application program log record generation according to an embodiment of the present invention. The system shown in FIG. 5 is represented as a whole by system 500. In particular, the system 500 includes a log method identification means 501 configured to identify an original log method in an application program, a parameter separation means 502 configured to separate a character string parameter in the original log method into a constant part and a variable part, a flag establishment means 503 configured to establish a correspondence flag between the constant part and the variable part, an optimized log method construction means 504 configured to constitute an optimized log method by the constant part, the variable part and the correspondence flag, and a log method replacement means 505 configured to replace the original log method with the optimized log method through a code injection. It can be understood that, the means 501-505 of the system 500 correspond to steps 301-305 of the method shown in FIG. 3 respectively, and the description thereof will not be repeated herein.

Figure 7:
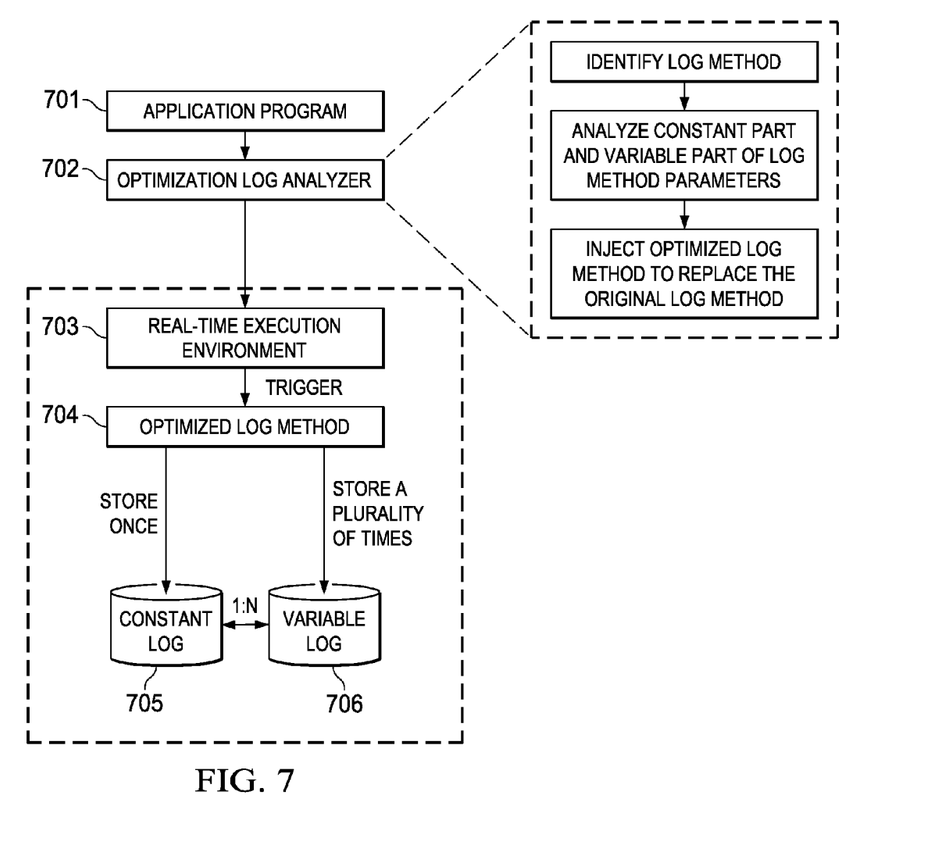
FIG. 7 shows a diagram of modules of a program log system according to an embodiment of the present invention.

FIG. 7 shows a diagram of constitution modules of a program log system according to an embodiment of the present invention. FIG. 7 aims to make a comparison with constitution modules of the program log system shown in FIG. 2, so as to have a better exhibition of the concept and the inventive points of the present invention, and it is not intended to impose any limitation on the present invention. The program log system shown in FIG. 7 includes an application program 701, an optimization log analyzer 702, a real-time execution system 703, an optimized log method 704, a constant log 705 and a variable log 706. Of the above, the application program 701 correspond to the application program 201 shown in FIG. 2, the real-time execution system 703 corresponds to the application program 202 shown in FIG. 2, and the description thereof will be repeated herein. The optimization log analyzer 702 serves to perform steps 301 to 305 shown in FIG. 3, and therefore, the original log method 203 shown in FIG. 2 is replaced with the optimized log method 704. Thus, the optimized log method can be utilized to store the constant parameter into the constant log 705 and to store the variable parameter into the variable log 706.

The flowcharts and block diagrams shown in appended drawings illustrate architecture, functionality and operation of possible implementation of systems, methods and computer program products according to various embodiments of the present invention. In this regard, each block in the flowcharts or block diagrams may represent a modular, program segment or part of code, which comprises one or more executable instructions for implementing the specified logic functions. It also should be noted that, in some alternative implementations, the functions noted in the block may also occur in an order other than the one noted in the drawings. For example, two blocks consecutively shown may, in fact, be performed substantially in parallel, or sometimes they may be performed in a reverse order, depending on the functionality involved. It also should be noted that, each block of the block diagrams and/or flowcharts and combinations thereof can be implemented by using a special purpose hardware-based system that executes the specified functions or operations, or by using a combination of a special purpose hardware and computer instructions.

While the system and method for processing local files by a remote application according to the present invention have been described in details hereinabove with reference to the specific examples, the present invention is not limited thereto. With teachings of the specification, those skilled in the art can make various modifications, variations and alternations to the present invention without departing from the spirit and scope of the present invention. It should be understood that, all of such modifications, variations and alternations still fall into the scope of the present invention. The protection scope of the present invention is defined by the appended claims.

What is claimed is:

1. A method, in a data processing system, for optimizing generation of an application program log record, comprising:
    identifying, by the data processing system, an original log method of an application program;
    separating, by the data processing system, a character string parameter in the original log method into a constant part and a variable part;
    establishing, by the data processing system, a correspondence flag for correlating between the constant part and the variable part;
    generating, by the data processing system, an optimized log method based on the constant part, the variable part, and the correspondence flag;
    replacing, by the data processing system, the original log method with the optimized log method; and
    executing, in a computing device, the application program and the optimized log method to generate an application program log record based on the optimized log method at least by:
        recording first log information corresponding to the constant part and the correspondence flag into a constant log file; and
        recording second log information corresponding to the variable part and the correspondence flag into a variable log file separate from the constant log file without logging the constant part in the variable log file, and wherein the correspondence flag correlates the first log information with the second log information wherein the first lo information corresponding to the constant part is only recorded once in the constant log file, and the second log information corresponding to the variable part is recorded in the variable log file each time generation of an application program log record is triggered, and wherein the constant part, variable part, correspondence flag, first log, information, and second log information are distinct.

2. The method according to claim 1, wherein generating the optimized log method based on the constant part, the variable part, and the correspondence flag comprises:
adding the correspondence flag to the constant part and the variable part respectively; and
incorporating the constant part and the variable part having the correspondence flag so as to constitute the optimized log method.

3. The method according to claim 1, wherein separating the character string parameter of the original log method into the constant part and the variable part comprises:
in response to an instruction in the original log method for creating the character string parameter being a constant parameter instruction for processing a constant string, setting the character string parameter created by the instruction to be the constant part; and
in response to the instruction in the original log method for creating the character string parameter being a variable parameter instruction for processing a variable character string, setting the character string parameter created by the instruction to be the variable part.

4. The method according to claim 3, wherein separating the character string parameter of the original log method into the constant part and the variable part further comprises:
locating the instruction in the original log method for creating the character string parameter; and
retrieving the instruction in the original log method for creating the character string parameter.

5. The method according to claim 1, wherein identifying the original log method of the application program comprises:
retrieving an object code of the application program; and
identifying in a class of the application program the original log method which has a specific name and processes the character string parameter.

6. The method of claim 1, wherein the first log information comprises a combination of the correspondence flag and the constant part, and wherein the second log information comprises a combination of the correspondence flag and the variable part.

7. The method of claim 6, wherein, in the first log information, the correspondence flag is inserted into the constant part as a pointer to the variable part, and in the second log information, the variable part is equated to the correspondence flag.

8. A system for optimizing an application program log record, comprising:
a processor; and
a memory coupled to the processor, wherein the memory comprises instructions which, when executed by the processor, cause the processor to:
identify an original log method of an application program;
separate a character string parameter in the original log method into a constant part and a variable part;
establish a correspondence flag for correlating between the constant part and the variable part;
generate an optimized log method based on the constant part, the variable part and the correspondence flag;
replace the original log method with the optimized log method; and
execute the application program and the optimized log method to generate an application program log record based on the optimized log method at least by:
recording first log information corresponding to the constant part and the correspondence flag into a constant log file; and
recording second log information corresponding to the variable part and the correspondence flag into a variable log file separate from the constant log file without logging the constant part in the variable log file, and wherein the correspondence flag correlates the first log information with the second log information, wherein the first log information corresponding to the constant part is only recorded once in the constant log file, and the second log information corresponding to the variable part is recorded in the variable log file each time generation of an application program log record is triggered, and wherein the constant part, variable part, correspondence flag, first log information, and second log information are distinct.

9. The system according to claim 8, wherein the generation of the optimized log method further comprises:
adding the correspondence flag to the constant part and the variable part respectively; and
incorporating the constant part and the variable part having the correspondence flag so as to constitute the optimized log method.

10. The system according to claim 8, wherein separating the character string parameter further comprises:
in response to an instruction in the original log method for creating the character string parameter being a constant parameter instruction for processing a constant string, setting the character string parameter created by the instruction to be the constant part; and
in response to the instruction in the original log method for creating the character string parameter being a variable parameter instruction for processing a variable character string, setting the character string parameter created by the instruction to be the variable part.

11. The system according to claim 10, wherein separating the character string parameter further comprises:
locating the instruction in the original log method for creating the character string parameter; and
retrieving the instruction in the original log method for creating the character string parameter.

12. The system according to claim 8, wherein identifying the original log method of the application program further comprises:
retrieving an object code of the application program; and
identifying in a class of the application program the original log method which has a specific name and processes the character string parameter.

13. The system of claim 8, wherein the first log information comprises a combination of the correspondence flag and the constant part, and wherein the second log information comprises a combination of the correspondence flag and the variable part.

14. The system of claim 13, wherein, in the first log information, the correspondence flag is inserted into the constant part as a pointer to the variable part, and in the second log information, the variable part is equated to the correspondence flag.

15. A computer program product comprising a non-transitory computer readable medium having a computer readable program stored therein, wherein the computer readable program, when executed on a data processing system, causes the data processing system to:

identify an original log method of an application program;

separate a character string parameter in the original log method into a constant part and a variable part;

establish a correspondence flag for correlating between the constant part and the variable part;

generate an optimized log method based on the constant part, the variable part, and the correspondence flag;

replace the original log method with the optimized log method; and execute the application program and the optimized log method to generate an application program log record based on the optimized log method at least by:

recording first log information corresponding to the constant part and the correspondence flag into a constant log file; and recording second log information corresponding to the variable part and the correspondence flag into a variable log file separate from the constant log file without logging the constant part in the variable log file, and wherein the correspondence flag correlates the first log information with the second log information, wherein the first log information corresponding to the constant part is only recorded once in the constant log file, and the second log information corresponding to the variable part is recorded in the variable log file each time generation of an application program log record is triggered., and wherein the constant part, variable part, correspondence flag, first log information, and second log information are distinct.

16. The computer program product according to claim 15, wherein generating the optimized log method based on the constant part, the variable part, and the correspondence flag comprises:

adding the correspondence flag to the constant part and the variable part respectively; and incorporating the constant part and the variable part having the correspondence flag so as to constitute the optimized log method.

17. The computer program product according to claim 15, wherein separating the character string parameter of the original log method into the constant part and the variable part comprises:

in response to an instruction in the original log method for creating the character string parameter being a constant parameter instruction for processing a constant string, setting the character string parameter created by the instruction to be the constant part; and in response to the instruction in the original log method for creating the character string parameter being a variable parameter instruction for processing a variable character string, setting the character string parameter created by the instruction to be the variable part.

18. The computer program product according to claim 17, wherein separating the character string parameter of the original log method into the constant part and the variable part further comprises:

locating the instruction in the original log method for creating the character string parameter; and retrieving the instruction in the original log method for creating the character string parameter.

19. The computer program product according to claim 15, wherein identifying the original log method of the application program comprises:

retrieving an object code of the application program; and identifying in a class of the application program the original log method which has a specific name and processes the character string parameter.

20. The computer program product of claim 15, wherein the first log information comprises a combination of the correspondence flag and the constant part, and wherein the second log information comprises a combination of the correspondence flag and the variable part.

21. The computer program product of claim 20, wherein, in the first log information, the correspondence flag is inserted into the constant part as a pointer to the variable part, and in the second log information, the variable part is equated to the correspondence flag.

* * * * *